EXAMINER

64

United States Patent Office 3,024,095

Patented Mar. 6, 1962

3,024,095

ACID TREATMENT OF TANTALUM TO REMOVE SURFACE IRREGULARITIES

Christopher J. B. Fincham, Boston, Mass., assignor to National Research Corporation, Cambridge, Mass., a corporation of Massachusetts No Drawing. Filed Apr. 25, 1958, Ser. No. 730,826
4 Claims. (Cl. 156—20)

This invention relates to the treatment of tantalum foil so as to provide on the foil a surface which can be anodized to permit manufacture of an electrolytic capacitor having a low leakage current.

Electrolytic capacitors formed of tantalum foil having an oxidized film surface recently have become commercially important, particularly in utilizations where reliability and small size are essential. It is generally believed that the surface smoothness of the tantalum foil, prior to the formation of the oxide coating thereon, is a critical factor in the suitability of a given foil for use as a capacitor. Microscopic irregularities on the surface can have an emormous effect upon the leakage current. Various techniques have been developed for smoothing the foil surface prior to the formation of the oxide film. One such technique is the use of electropolishing, and another is the use of a strong acid solution containing concentrated sulfuric acid, nitric acid and hydrofluoric acid. Both of these known techniques have certain disadvantages.

Accordingly, a principal object of the present invention is to provide an improved method for treating thin tantalum foil to prepare the surface for the anodizing step which is employed in producing electrolytic capacitors.

Another object of the invention is to provide such a method which is particularly adapted to treating half mil (.0005 in.) foil and which can be practiced by relatively unskilled workers without danger of damaging the foil.

These and other objects of the invention will in part be obvious and will in part appear hereinafter.

The present invention will be primarily described in connection with its application to the treatment of half mil tantalum foil having microscopic surface irregularities. In the prior art treatment of such foil, prior to anodizing for the production of an oxide film on the foil, a very strong acid solution is employed. This prior art solution consists essentially of 5 parts by volume of concentrated sulfuric acid, 2 parts by volume of 70% nitric acid and 2 parts by volume of 48% hydrofluoric acid. While such a solution gives an excellent smooth surface, it attacks the tantalum foil at such an extremely rapid rate that extreme care in utilizing the acid must be employed. For example, even with the treatment limited to 3 seconds approximately 12% of a half mil foil is dissolved. This is not only wasteful of tantalum, since half mil foil sells for approximately $90 a pound, but can also be completely destructive if the treatment is inadvertently carried out for any extended period of time. In the present invention an acid treatment of the foil surface is employed, but the acid treatment is such that it can be readily controlled and not be critical as to time and temperature and which gives results comparable, from an electrical standpoint, to the prior art method and is much less wasteful of tantalum.

The treating solution of the present invention consists essentially of 2 to 5 weight percent hydrofluoric acid and 10 to 20 weight percent nitric acid, the balance of this solution being water. The tantalum foil, preferably half mil, is immersed in the treating solution for a time sufficiently long to give a surface having a smoothness corresponding to a leakage current of less than 2 microamperes per square inch (of projected area) through an anodically-created oxide film when tested at an applied potential of 180 volts. As a general proposition, this time is somewhat in excess of 20 minutes, preferably about 30 minutes or so. However, this time is not particularly critical. The time for treatment is terminated before as much as 10 weight percent of the tantalum is dissolved. Thereafter the foil is washed and anodized in an aqueous solution at a voltage between 180 and 500 volts by normal techniques to provide an oxide surface having a satisfactory low leakage rate.

Several comparisons of the present invention with the prior art are set forth below in Table I. In this table there are three separate solutions described. The first is the "Prior Art Solution" and was prepared by mixing together 134 cc. of concentrated sulfuric acid, 53 cc. of 70% nitric acid and 53 cc. of 48% hydrofluoric acid. Solution 1 was prepared by mixing together 10 cc. of 48% hydrofluoric acid and 34 cc. of 70% nitric acid plus 200 cc. distilled water. This gave a 2.2 weight percent of hydrofluoric acid and 13 weight percent of nitric acid. Solution 2 was prepared by mixing 14.7 cc. of 48% of hydrofluoric acid and 42.5 cc. of 70% of nitric acid plus 340 cc. distilled water. This gave a solution containing 2.0 weight percent of hydrofluoric acid and 10 weight percent nitric acid.

"Time of Treatment" is the time the half mil tantalum was immersed in the treating solution. The samples to be treated and the standards were cut from larger rolls of half mil foil in the "as rolled" condition. Some of the samples were anodized without treatment to obtain an average leakage current. This is listed as "Before" in Table I. Other samples of a given foil in "as rolled" condition were given the treatments specified in Table I. After treatment, these samples were anodized and the leakage current was tested. This is the "After" value. The "Percent Weight Loss" is the actual measured weight loss of each sample as a result of the treatment in the acid solution.

*Table I*

| Acid treating solution | Time of treatment | Leakage current [1] | | Percent weight loss |
|---|---|---|---|---|
| | | Before | After | |
| Prior art solution | 3 sec. | 3.4 | .29 | 12.0 |
| Solution 1 | 20 min. | 3.4 | 1.3 | 1.3 |
| Do | 30 min. | 3.4 | .40 | 2.4 |
| Solution 2 | 30 min. | 3.4 | .44 | 2.0–3.0 |
| Prior art solution | 3 sec. | 9.2 | .32 | 13.2 |
| Solution 1 | 30 min. | 9.2 | .69 | 1.9 |
| Do | 30 min. | >200 | 1.6 | 1.0–3.0 |

[1] Microamperes per square inch of projected area.

It can be seen that the "prior art solution," while quite effective in preparing a surface which can be anodized to give low leakage current, does have the disadvantage of being extremely wasteful of tantalum and difficult to control. The acid treating solution of this invention, on the other hand, gives an adequate surface for anodizing which is not critical as to time and yet can up-grade an extremely poor surface to produce one of adequate smoothness.

It should also be pointed out that the above treatment does not substantially increase the capacitance of the subsequently formed oxide film. Tests of "before" and "after" film showed substantially identical capacitance.

Since certain changes may be made in the above process without departing from the scope of the invention herein involved, it is intended that all matter contained in the above description, or shown in the accompanying drawings, shall be interpreted as illustrative and not in a limiting sense.

What is claimed is:

1. In a process for producing a smooth surface on tantalum foil for use in electrolytic capacitors the improvement which comprises subjecting the rough surface of as-rolled foil to a solution consisting essentially of 2 weight percent hydrofluoric acid, 10 weight percent nitric acid and 88 percent weight water for 20 minutes, whereby sharply-contoured microscopic surface irregularities are removed without substantial waste of tantalum.

2. In a process for producing a smooth surface on tantalum foil for use in electrolytic capacitors the improvement which comprises subjecting the rough surface of as-rolled foil to a solution consisting essentially of 2.2 weight percent hydrofluoric acid, 13 weight percent nitric acid and 84.8 weight percent water for 30 minutes, whereby sharply-contoured microscopic surface irregularities are removed without substantial waste of tantalum.

3. In a process for producing a smooth surface on ½ mil tantalum foil for use in electrolytic capacitors, the improvement which comprises subjecting the rough surface of as-rolled foil to a solution consisting essentially of 2 to 5 weight percent hydrofluoric acid, 10 to 20 weight percent nitric acid and 75 to 88 percent weight water for from 10 to 30 minutes and then stopping the acid treatment whereby sharply-contoured microscopic surface irregularities are removed without substantial waste of tantalum.

4. The process of claim 3 wherein less than 10 percent weight of the tantalum foil is dissolved.

References Cited in the file of this patent

UNITED STATES PATENTS

| | | |
|---|---|---|
| 2,466,095 | Gall | Apr. 5, 1949 |
| 2,481,306 | Gall | Sept. 6, 1949 |
| 2,565,623 | Parker | Aug. 28, 1951 |
| 2,808,542 | Vermilyea | Oct. 1, 1957 |
| 2,828,192 | Langsfeld | Mar. 25, 1958 |
| 2,856,275 | Otto | Oct. 14, 1958 |